United States Patent
Pansonatto (10) Patent No.: US 11,643,138 B2
(45) Date of Patent: May 9, 2023

(54) LUBRICANT-FREE STEERING AXLE ASSEMBLY

(71) Applicant: Dana Heavy Vehicle Systems Group, LLC, Maumee, OH (US)

(72) Inventor: Juliano Pansonatto, Sorocaba (BR)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/185,809

(22) Filed: Feb. 25, 2021

(65) Prior Publication Data

US 2022/0266902 A1 Aug. 25, 2022

(51) Int. Cl.
*B62D 7/08* (2006.01)
*B62D 7/18* (2006.01)
*F16C 17/04* (2006.01)

(52) U.S. Cl.
CPC .............. *B62D 7/08* (2013.01); *B62D 7/18* (2013.01); *F16C 17/04* (2013.01); *F16C 2361/31* (2013.01)

(58) Field of Classification Search
CPC ... B62D 7/08; B62D 7/18; F16C 17/04; F16C 2361/31
See application file for complete search history.

(56) References Cited

U.S. PATENT DOCUMENTS

| | | | | |
|---|---|---|---|---|
| 3,844,182 | A | * 10/1974 | Bradshaw | ............... F16H 19/04 74/498 |
| 5,538,274 | A | * 7/1996 | Schmitz | .................... F16F 1/38 280/124.135 |
| 5,975,547 | A | 11/1999 | Stroh et al. | |
| 6,607,203 | B2 | * 8/2003 | Bodin | ..................... F16C 21/00 280/124.125 |
| 7,093,843 | B2 | 8/2006 | Varela et al. | |
| 8,490,986 | B1 | 7/2013 | Ostrander et al. | |
| 8,764,034 | B2 | 7/2014 | Wells et al. | |
| 9,211,908 | B2 | * 12/2015 | Stjernling | ............... F16C 21/00 |
| 10,253,805 | B2 | * 4/2019 | Denner | ................. F16C 11/045 |
| 10,421,488 | B2 | 9/2019 | Lam et al. | |
| 2003/0035603 | A1 | 2/2003 | Kaiser | |
| 2019/0256134 | A1 | 8/2019 | Batz et al. | |

* cited by examiner

*Primary Examiner* — James A English
*Assistant Examiner* — Daniel M. Keck
(74) *Attorney, Agent, or Firm* — McCoy Russell LLP (57) ABSTRACT

Methods and systems are provided for a steering axle assembly. In one example, a system may include a tapered pin coupled to a steering knuckle and to an axle beam end. A set of bushings may circumferentially surround the tapered pin and enable rotation of the steering knuckle around the tapered pin without lubricant.

18 Claims, 4 Drawing Sheets

LUBRICANT-FREE STEERING AXLE ASSEMBLY

TECHNICAL FIELD

The present description relates generally to methods and systems for a vehicle steering axle assembly.

BACKGROUND AND SUMMARY

A vehicle may be adapted with a steering axle assembly at a front axle to allow a vehicle operator to control vehicle navigation. In heavy duty vehicles, such as trucks, buses, etc., the steering axle assembly may have a wheel end where a steering knuckle is coupled to a steering arm where the coupling is provided by a pin. For example, as shown in U.S. Pat. No. 10,421,488, an axle assembly may rely on a kingpin as a pivotal connector between the steering knuckle and an axle beam. The kingpin may be inserted through holes in the steering knuckle and the axle beam, allowing the steering knuckle and axle beam to rotate relative to one another via bearings arranged between the steering knuckle and the kingpin. More specifically, the axle assembly includes bearings coupled to the kingpin to facilitate rotation of the steering knuckle about the kingpin with respect to the axle beam. Other examples may include various additional components to enable rotation in the axle assembly, such as additional bearings, bushings, etc.

However, the inventors herein have recognized potential issues with such systems. As one example, low-friction rotation provided by the axle assembly may rely on lubrication of the assembly. If a maintenance frequency demanded by the axle assembly is not met, surfaces of the axle assembly may be insufficiently lubricated, leading to degradation of components. Constant re-application of lubricant, however, may be inconvenient and, in some instances, may be difficult to maintain.

In one example, the issues described above may be addressed by an axle assembly, comprising a tapered pin rotatably coupled to a steering knuckle and non-rotatably coupled to an axle beam end, a set of bushings circumferentially surrounding the tapered pin, and a thrust bearing arranged between the steering knuckle and the axle beam end along a central axis of rotation of the tapered pin, wherein the rotation of the steering knuckle and the axle beam end about the tapered pin is enabled without lubricant. In this way, lubrication of the steering axle assembly is precluded.

As one example, the bushings may be formed of a material that reduces friction between interfacing surfaces of the steering knuckle and the tapered pin in a similar manner as lubricant. The thrust bearing may be arranged in between an arm of the steering knuckle and the axle beam end along a central axis of the tapered pin such that an axial load placed upon the axle assembly does not inhibit the rotation of the steering knuckle. The reduction of friction provided by the bushings allows smooth rotation without lubricant. As a result, the axle assembly may be maintained less frequently and a useful life of components of the axle assembly may be prolonged, thereby reducing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2 and 4 are shown approximately to scale

DETAILED DESCRIPTION

Figure 1:
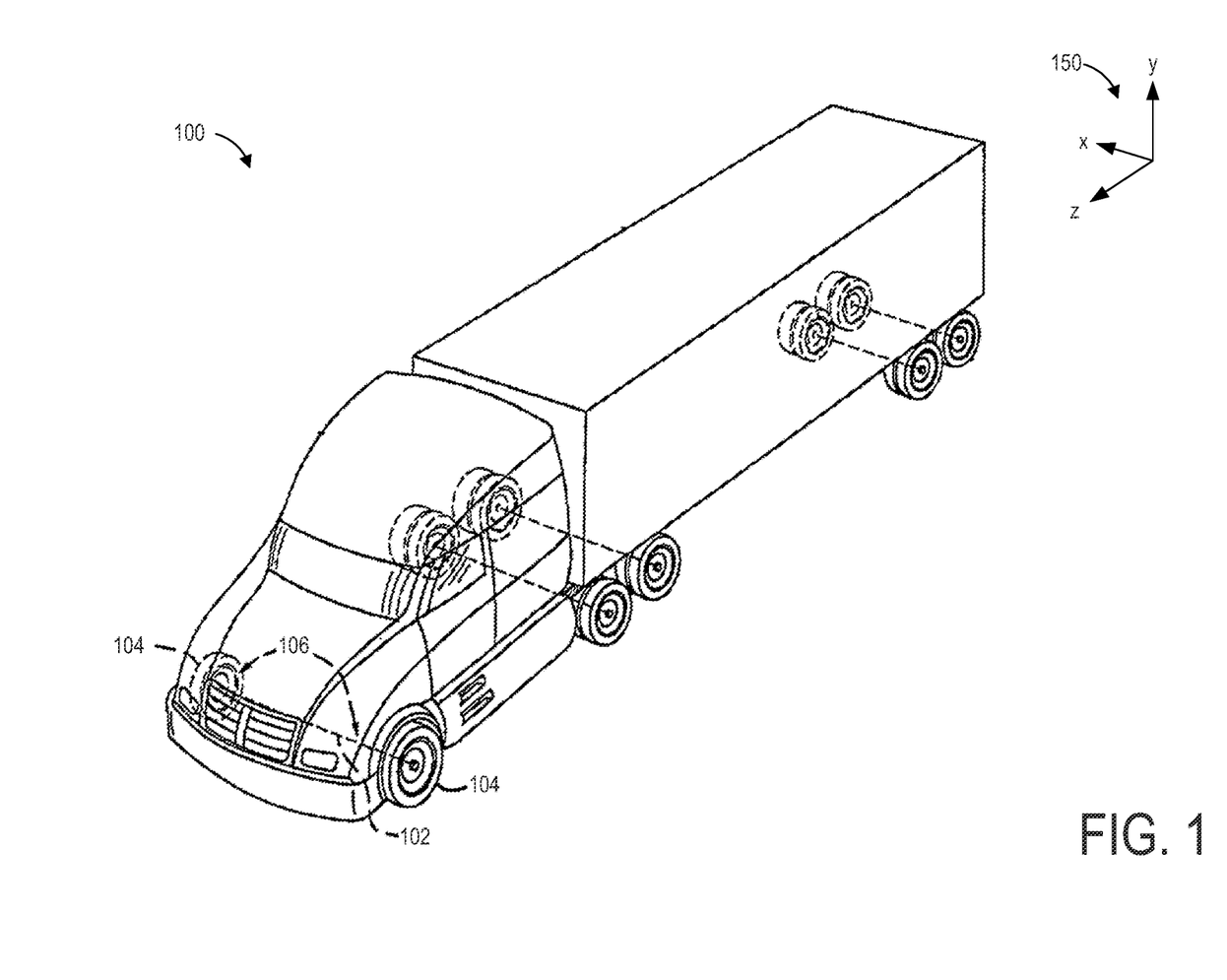
FIG. 1 shows an example of a vehicle which may be adapted with a lubricant-free steering axle assembly.
Figure 2:
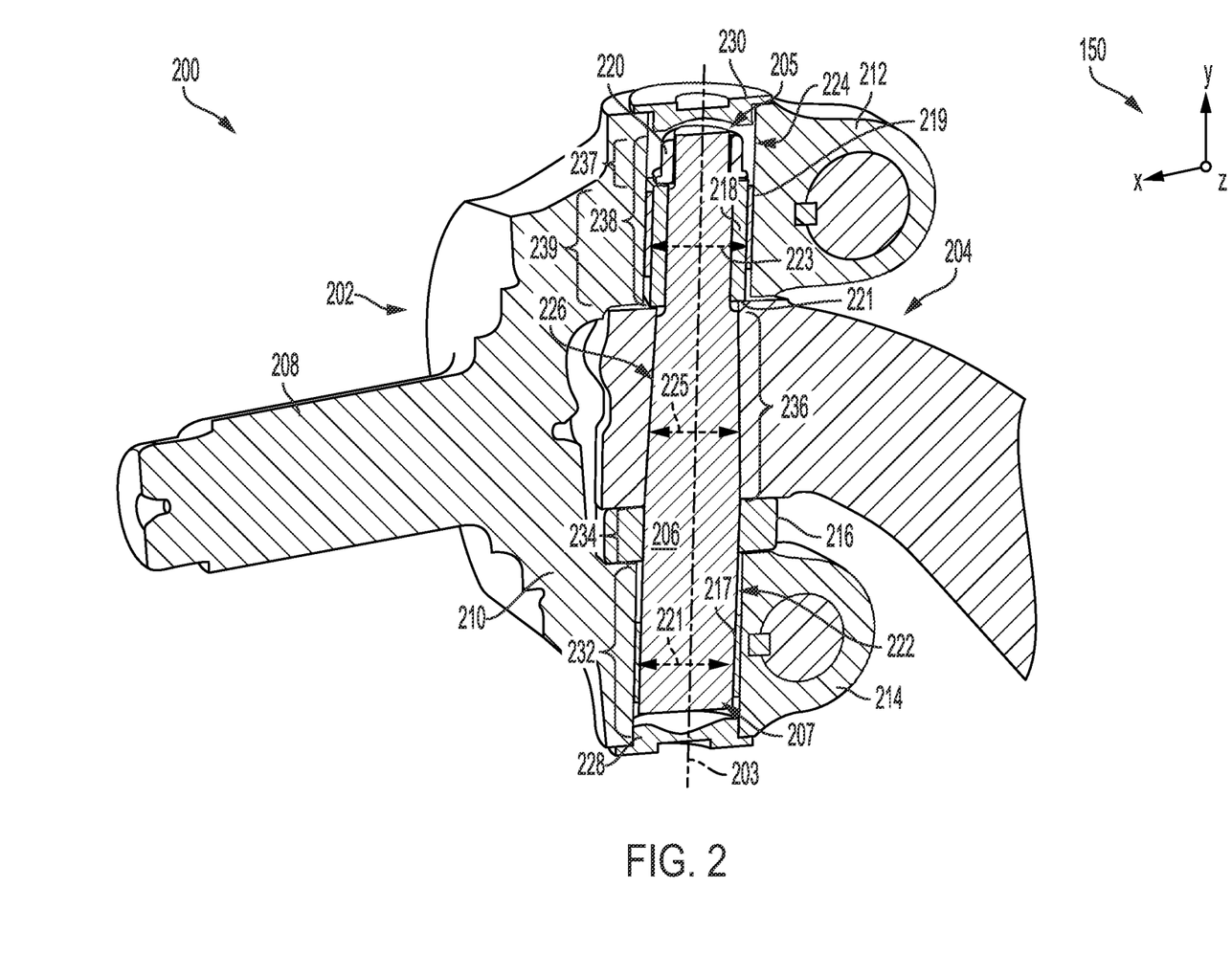
FIG. 2 shows a cut-away view of an example of the lubricant-free steering axle assembly.
Figure 3:
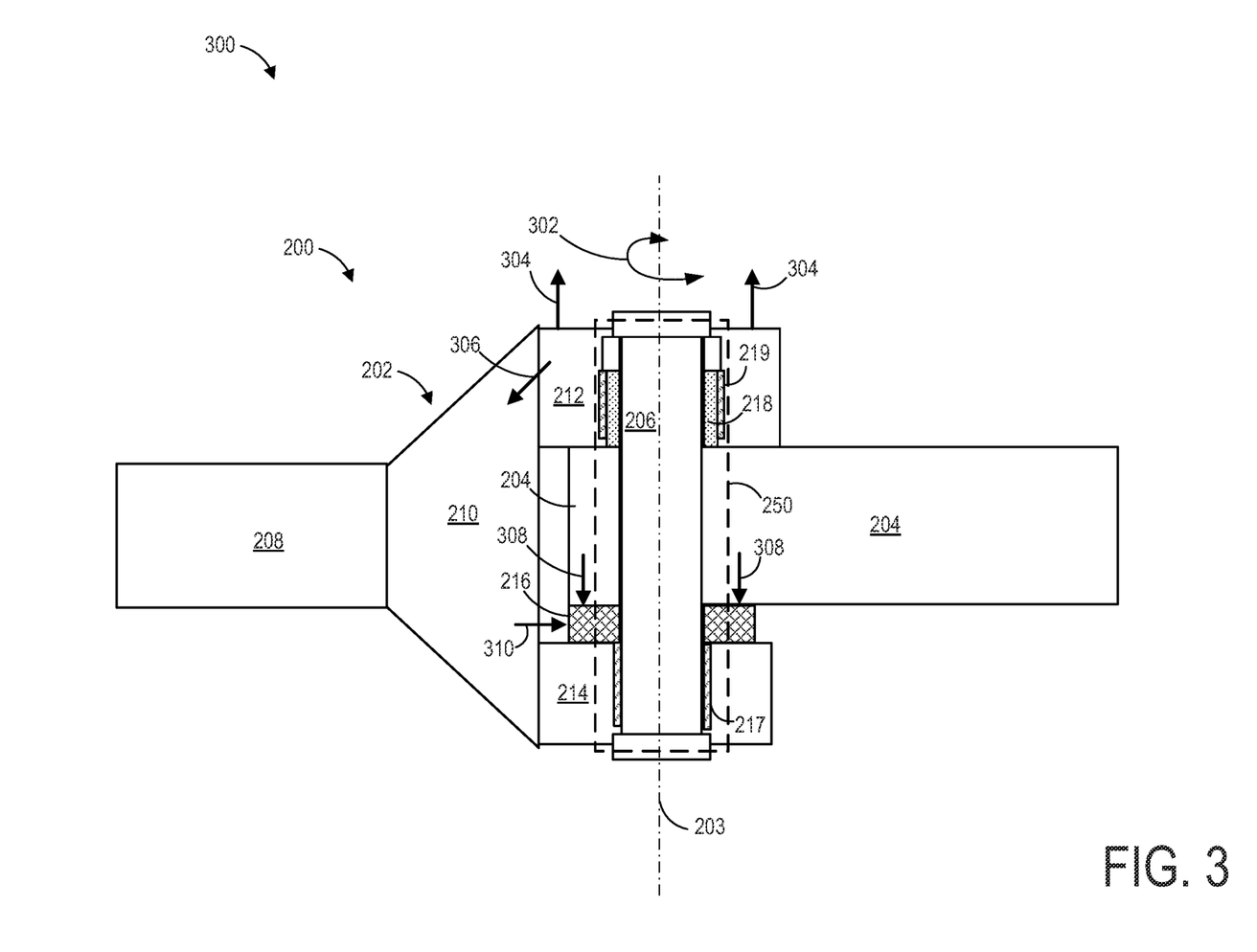
FIG. 3 is a schematic diagram depicting forces imposed on the lubricant-free steering axle assembly.
Figure 4:
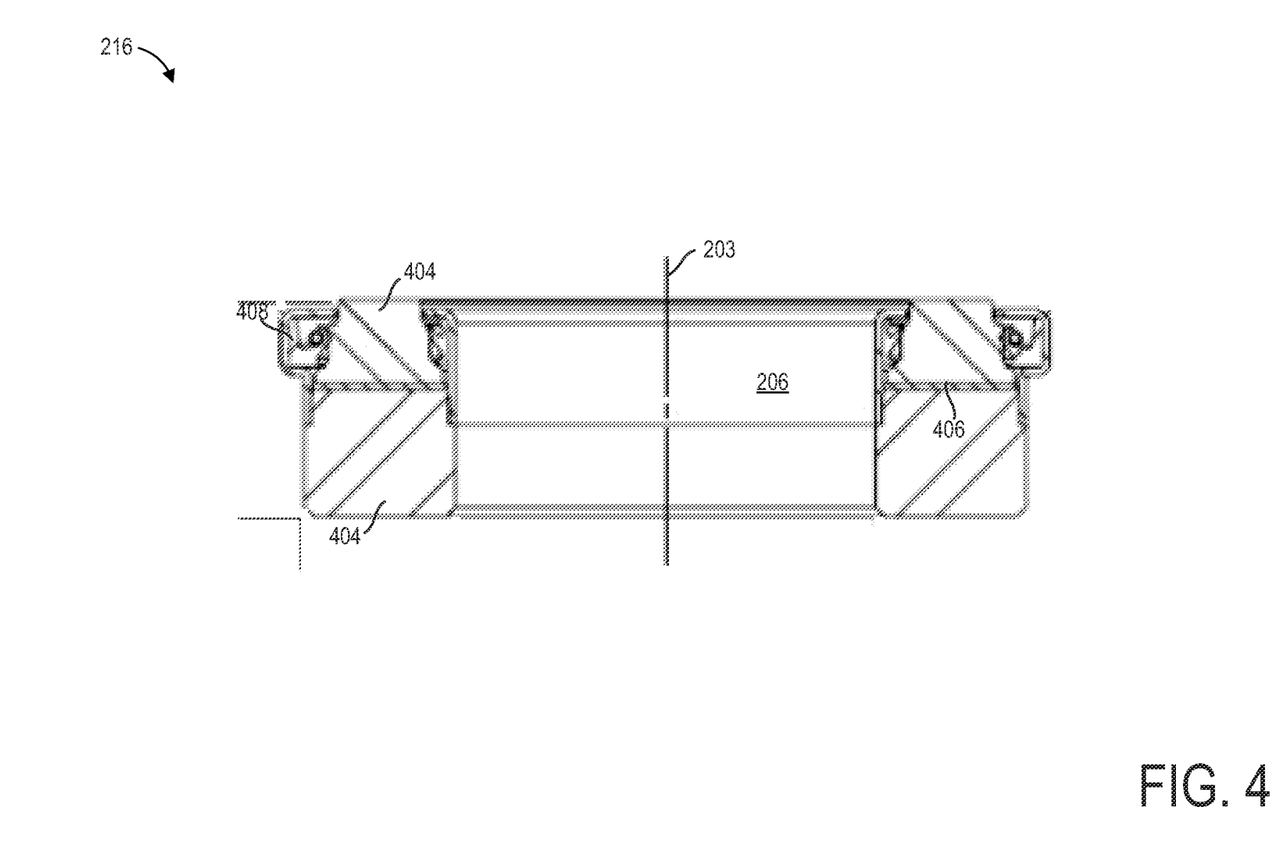
FIG. 4 shows an example of a thrust bearing which may be included in the lubricant-free steering axle assembly.

The following description relates to systems and methods for a steering axle assembly. The steering axle assembly may be implemented in a vehicle to enable steering control of the vehicle. For example, the vehicle may be a large truck, as shown in FIG. 1, and the steering axle assembly may be included at a front axle of the truck. However, the vehicle may be various other types of large vehicles, such as a bus. The steering axle assembly may be configured to be lubricant-free, demanding minimal maintenance and reducing a likelihood of degradation due to wear. An example of the lubricant-free steering axle assembly is depicted in FIG. 2 and an example of a thrust bearing used in the assembly is shown in FIG. 4. The lubricant-free steering axle assembly may be configured to provide a similar reduction in frictional forces generated between moving parts, while providing load support. A schematic diagram of the lubricant-free steering axle assembly, indicating imposed loads and regions where friction may be expected, is shown in FIG. 3.

FIGS. 1-4 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a vehicle such as a large truck 100 may include more than one axle beam connecting wheels of the truck 100. In particular, a front axle 102 may extend between front wheels 104 of the truck 100, coupling rotation of the front wheels 104 during travel. A set of reference axes 150 are provided, indicated a y-axis, an x-axis, and a z-axis. In one example, the y-axis may be parallel with a direction of gravity. A steering axle assembly may be implemented at the front axle 102, as indicated by arrow 106, at regions between each of the front wheels 104 and ends of the front axle 102. The steering axle assembly may enable pivoting of the front wheels 104 relative to the front axle 102 to allow navigation of the truck 100 through turns.

Conventional steering axle assemblies may rely on lubrication, such as oil, grease, etc., for low-friction rotation of components and reduction of abrasive wear resulting from contact between the components. However, as the steering axle assembly may experience continuous motion during driving cycles, lubricant may be lost or become contaminated during vehicle operation. Thus, frequent replenishing of lubricant may be demanded to mitigate degradation of steering axle assembly components, leading to costly repair and/or replacement of parts.

In one example, a vehicle may be adapted with a lubricant-free steering axle assembly. As an alternative to lubricant, the steering axle assembly may include a sealed axial bearing and bushings formed of a material that enables rotation of a steering knuckle about a locking pin with minimal friction. Furthermore, the bushings and axial bearing preclude maintenance, thus alleviating time spent maintaining an integrity of the steering axle assembly and reducing overall costs.

An example of a steering axle assembly 200 configured to be lubricant-free is illustrated in FIG. 2. In one example, the steering axle assembly 200 may be implemented in a vehicle, such as the truck 100 of FIG. 1, in regions indicated by arrow 106. The steering axle assembly 200 is formed from various components, including a steering knuckle 202 and an axle beam end 204, each coupled to a pin 206, e.g., a kingpin 206. The steering knuckle 202, the axle beam end 204, and the kingpin 206 may each be formed of a rigid, durable material, such as steel, aluminum, etc. Further details of each component are provided further below.

The steering knuckle 202 may be a single, continuous unit with a spindle 208 protruding from a body 210 of the steering knuckle 202. The spindle 208 may extend along the x-axis as a cylindrical structure configured to be coupled to a wheel, such as one of the front wheels 104 of FIG. 1. For example, the spindle 208 may be inserted through a wheel hub to secure the front wheel to the steering axle assembly 200.

The steering knuckle 202 has an upper arm 212 and a lower arm 214, the upper arm 212 and the lower arm 214 extending parallel with one another along the x-axis and away from the body 210 in an opposite direction from the spindle 208. The arms may be staggered relative to the spindle 208 along the y-axis, with the upper arm 212 positioned higher than the spindle 208 and the lower arm 214 arranged lower than the spindle 208. The upper arm 212 is stacked above the lower arm 214 with respect to the y-axis with a space in between the arms to allow the axle beam end 204 and a thrust bearing 216 to be inserted therein. Each arm has an opening, e.g., a bore, extending entirely through each arm along the y-axis, where the lower arm 214 has a first bore 222, which may also be a lower arm bore 222 and the upper arm 212 has a second bore 224, which may also be an upper arm bore 224. The lower arm bore 222 has a diameter 221 and the upper arm bore 224 has a diameter 223. Details of the diameters will be described further below. The bores on each of the lower and upper arms 212, 214 may be aligned along the y-axis to allow passage of the kingpin 206 through each bore.

The axle beam end 204 may be a single continuous unit that extends away from the kingpin 206 along the z-axis and couples to the kingpin 206 in the space between the upper arm 212 and the lower arm 214 of the steering knuckle 202. In one example, the axle beam end 204 may be a terminal end of a front axle, such as the front axle 102 of FIG. 1. The axle beam end 204 includes a third bore 226 extending entirely through the axle beam end 204 along the y-axis, the third bore having a diameter 225.

The kingpin 206 may be a substantially cylindrical metal rod, with a diameter, as defined along the x-axis, that varies along its length, the length of the kingpin 206 parallel with the y-axis and parallel with a central axis of rotation 203 of the kingpin 206. The kingpin 206 may be tapered such that the diameter at a top end 205 of the kingpin 206 is smaller than the diameter at a bottom end 207 of the kingpin 206. The tapering of the kingpin 206 may assist in maintaining a position of the kingpin 206 relative to the steering knuckle 202 and the axle beam end 204 along the central axis of rotation 203, even when an axial load is applied to the steering axle assembly 200. In other words, the tapering of the kingpin 206 inhibits axial sliding of the kingpin 206. The kingpin 206 may have a first section 232, a second section 234, a third section 236 and a fourth section 238, the sections stacked sequentially as described along the y-axis. The diameter of the kingpin 206 may differ between the sections and may also vary within a single section.

For example, the first section 232 of the kingpin 206 may be positioned at the bottom end 207 of the kingpin 206. The diameter of the kingpin 206 may be the largest through the first section 232 and may be relatively uniform throughout the first section 232. The first section 232 may be configured to be inserted through the lower arm bore 222 of the steering knuckle 202 but the diameter of the first section 232 may be smaller than the diameter 221 of the lower arm bore 222 such that a first bushing 217 is positioned between an inner surface of the lower arm bore 222 and the kingpin 206 at the first section 232. As such, the surface of the kingpin 206 at the first section 232 does not contact the inner surface of the lower arm bore 222. Instead, an outer surface of the first bushing 217 may be in face-sharing contact with the inner surface of the lower arm bore 222 and an inner surface of the first bushing 217 may be in face-sharing contact with the surface of the kingpin 206.

The second section 234 of the kingpin 206 is positioned above the first section 232, with respect to the y-axis, and may have a narrower diameter than the first section 232. In one example, as shown in FIG. 2, the second section 234 may be configured to be circumferentially surrounded by a thrust bearing 216. The thrust bearing 216 may be a toroid with an opening configured to receive the kingpin 206. An inner diameter of the thrust bearing 216 may be similar to the diameter of the second section 234 of the kingpin 206 at a region where the thrust bearing 216 is in contact with the kingpin 206. A thickness of thrust bearing 216, as defined along the x-axis, may be configured to provide sufficient robustness to the thrust bearing 216 to support axial loads imposed on the steering axle assembly 200 while providing enough clearance so that the thrust bearing 216 does not come into contact with the body 210 of the steering knuckle 202.

The thrust bearing 216 may be configured as a sealed thrust bearing and may include an inner bearings sandwiched between collars. In one example, as shown in FIG. 4, the thrust bearing 216 may be an axial bearing assembly formed by two raceways. The two raceways include a lower raceway 402 and an upper raceway 404 with a friction element 406 separating the two raceways from one another. The friction element 406 may be similarly configured as the first bushing 217. The thrust bearing 216 may further include one or more retainers 408 to maintain the assembly closed.

Returning to FIG. 2, the third section 236 of the kingpin 206 is positioned above the second section 234, with respect to the y-axis, and may have a diameter smaller than the second section 234. In addition, the diameter of the third section 236 may vary throughout its length, and may be configured to be inserted into the third bore 226 of the axle beam end 204. As such, the diameter 225 of the third bore 226 of the axle beam end 204 may vary in a similar manner as the diameter of the third section 236 of the kingpin 206. In other words, an inner surface of the third bore 226 may be in face-sharing contact with the surface of the kingpin 206 at the third section 236 such that the diameter 225 of the third bore 226 is similar to the diameter of the third section 236 of the kingpin 206 at any point of contact between the third bore 226 and the third section 236.

The axle beam end 204 may be fixedly coupled to the kingpin 206 at the third section 236, e.g., the axle beam end 204 and the kingpin 206 do not rotate relative to one another. The coupling may also hinder axial movement of the axle beam end 204 along the kingpin 206.

The fourth section 238 of the kingpin 206 is located at the top end 205 of the kingpin 206, above the third section 236, and, in one example, may form a journal of the kingpin 206. As such, the diameter of the kingpin 206 is narrowest at the fourth section 238. Furthermore, the fourth section 238 includes a first subsection 237 and a second subsection 239, where the second subsection 239 is arranged below the first subsection 237 and has a larger diameter than the first subsection 237. The fourth section 238 may be inserted though the upper arm bore 224 of the upper arm 212 of the steering knuckle 202 but does not directly contact an inner surface of the upper arm bore 224. For example, the fourth section 238 may have a smaller diameter than the diameter 223 of the upper arm bore 224. A second bushing 218 and a third bushing 219 may circumferentially surround the second subsection 239 of the fourth section 238 where the second bushing 218 and the third bushing 219 are concentrically arranged with the second bushing 218 placed between the kingpin 206 and the third bushing 219. In other words, an outer surface of the third bushing 219 is in face-sharing contact with the inner surface of the upper arm bore 224, an inner surface of the third bushing 219 is in face-sharing contact with an outer surface of the second bushing 218, and an inner surface of the second bushing 218 is in face-sharing contact with the surface of the kingpin 206. The second bushing 218 may be configured as a sliding track for the third bushing 219 and may additionally secure the kingpin 206 through a nut 220. The third bushing 219 may be a sliding element enabling movement without lubrication.

The first subsection 237 may be configured to receive the nut 220. The nut 220 may be fixedly coupled to the first subsection 237, e.g., the nut 220 and the kingpin 206 do not shift radially or axially (e.g., along the y-axis) relative to one another. The coupling of the nut 220 to the kingpin 206 may maintain axial positions of the second and third bushings 218, 219 such that the bushing do not slide upwards along the kingpin 206. Axially downwards sliding of the second bushing 218 is inhibited by abutment of a bottom edge 227 of the second bushing 218 against the axle beam end 204.

The lower and upper arm bores 222, 224 of the steering knuckle 202 may be sealed with caps. For example, a first, lower cap 228 sealing engages with and covers a bottom opening of the lower arm bore 222, and a second, upper cap 230 sealingly engages with and covers a top opening of the upper arm bore 224, directly above the nut 220. Each cap may be a solid continuous unit without any openings. In this way, the kingpin 206 may be enclosed within an inner chamber 250 that extends along the entire length (as defined along the y-axis) of the kingpin 206, where the walls of the inner chamber 250 may be defined by inner surfaces of the lower and upper arm bores 222, 224, an inner surface of the thrust bearing 216 and an inner surface of the third bore 226 of the axle beam end 204. As a result, coupling of the lower cap 228 to the lower arm bore 222 and the upper cap 230 to the upper arm bore 224 may block exchange of air between outside of the inner chamber 250 and inside of the inner chamber 250. In this way, fluids, such as air and liquids, may not flow into or out of the inner chamber 250.

An arrangement of the components of the steering axle assembly 200 may be adapted to receive and distribute various forces imposed on the steering axle assembly 200 by a weight of the vehicle and by navigation of the vehicle. A schematic diagram 300 indicating movement of the steering axle assembly 200 and applied forces is shown in FIG. 3. It will be noted that the kingpin 206 is represented as a cylindrical structure (e.g., without tapering) in FIG. 3 for simplicity. The steering knuckle 202 may be connected to a steering system of the vehicle (not shown) and rotated by the steering system. A torque applied to the steering knuckle 202 may cause the steering knuckle 202 to rotate in the x-z plane around the central axis of rotation 203, as indicated by arrow 302, while the kingpin 206 and the axle beam end 204 remain stationary. A frictional force may be generated between surfaces of components that are in contact and rotatably coupled in the steering axle assembly 200. This frictional force may resist rotation and cause the surfaces to become worn and abraded.

In conventional steering axle assemblies, a lubricant, such as oil or grease, may be used to lubricate the interfaces and reduce friction there between. In lubricated assemblies, lubricant may be stored in the inner chamber 250. Thus the kingpin 206 may be surrounded by a reservoir of lubricant which may sealed by caps fitted with openings, e.g., zerks, to allow lubricant to be added to and removed from the reservoir. However, use of lubricant demands frequent maintenance and deviation from a high frequency maintenance schedule may lead to degradation of steering axle assembly parts.

To reduce the friction in areas of contact between the kingpin 206 and the steering knuckle 202, the first, second, and third bushings 217, 218, 219 may be inserted as described above. The first bushing 217 and the third bushing 219 may be thin sleeves that do not rotate relative to the steering knuckle 202, e.g., the bushings are fixedly coupled to the inner surfaces of the bores of the steering knuckle 202d. In other words, the first and second bushings 217, 219 may be fixed in place relative to inner surfaces of the lower arm bore 222 and the upper arm bore 224, respectively, and configured to rotate about the kingpin 206 in unison with the steering knuckle 202. For example, the first and second bushings 217, 219 may be held in place by friction within the bores of the steering knuckle 202 but allow sliding along surfaces in contact with the second bushing 218 and the kingpin 206.

The second bushing 218 may be thicker than the first and third bushings 217, 219, to occupy space between the narrowed second subsection 239 of the fourth section 238 of the kingpin 206. Furthermore, the second bushing 218 may lock the kingpin 206 along the axle beam end 204 via tightening of the nut 220. Additionally, the second bushing 218 may provide a sliding engagement with the third bushing 219, as described above, as result of its outer diameter being equal to the diameter of the kingpin 206 (e.g., the diameter 223) at a region of where the second bushing 218 surrounds the kingpin 206.

The second bushing 218 may be fixedly coupled to the surface of the kingpin 206 such that the second bushing 218 does not rotate relative to the kingpin 206. Thus the third bushing 219 may rotate around the second bushing 218 when compelled by rotation of the steering knuckle 202. Properties of surfaces at interfaces between rotating components, e.g., between the third bushing 219 and the second bushing 218 as well as between the first bushing 217 and the lower arm bore 222 may determine an amount of wear imposed on the interfacing surfaces from the friction generated between the surfaces. Thus, the bushings may be formed from materials that minimize friction, thus reducing degrading of the component surfaces.

In one example, the first and third bushings 217, 219 may each be formed from more than one material. For example, an outer portion of the bushings may be formed of a metal such as low carbon steel, allowing assembly of the bushings within the bores of the steering knuckle 202 by interference. An inner portion of the bushings may be formed of a polymer configured to provide maximum resistance to effort as well as low friction to enable sliding along joints formed by the bushings and the kingpin 206. The second bushing 218 may be formed entirely of a metal, such as medium carbon steel. The second bushing 218 may receive a heat treatment to harden its outer surface to reduce friction wear and allow the second bushing 218 to support a torque load from the nut 220.

In addition to frictional forces, a first axial load may be placed on the steering axle assembly 200 due to positioning of a body of the vehicle above the steering axle assembly. For example, the vehicle frame may be supported on the axle beam end 204 by suspensions springs. A weight of the vehicle may impose an upwards force, e.g., the first axial load, on the steering knuckle 202 through the suspension system, as indicated by arrows 308. The first axial load is absorbed by the steering knuckle 202 through the body 210 of the steering knuckle 202, as indicated by arrow 306.

A second axial load, as indicated by arrows 304, may be imposed on the steering axle assembly 200 due to a weight of the front axle as transmitted through the axle beam end 204. The weight of the front axle may also include a weight of accessories coupled to the front axle, such as a drive train, a differential, etc. The second axial load may primarily affect components arranged below the axle beam end 204 in the steering axle assembly 200, e.g., the thrust bearing 216 and the lower arm 214 of the steering knuckle 202. A downwards force applied by the axle beam end 204 may be absorbed by the thrust bearing 216, thus allowing the steering knuckle 202 to rotate around the kingpin 206 unhindered by the second axial load. The positioning of the thrust bearing 216 may provide a low-friction interface between an upper surface of the lower arm 214 of the steering knuckle 202 and a lower face of the thrust bearing 216, to further promote smooth rotation of the steering knuckle 202. Furthermore, the thrust bearing 216 may assist in mitigating sliding of the steering axle assembly components along the y-axis as well as reducing wobbling of the kingpin 206, e.g., motion of the kingpin 206 along the x-z plane.

In conventional steering axle assemblies, the thrust bearing 216 may be arranged in a reservoir of lubricant, e.g., the inner chamber 250 of the steering axle assembly 200, allowing the inner bearings of the thrust bearing to operate with minimal friction. In the lubricant-free steering axle assembly 200 of FIGS. 2 and 3, however, the thrust bearing 216 is sealed, e.g., by the retainers 408 of FIG. 4, to inhibit entry of dirt and contaminants. As such, use of lubricant is precluded.

In this way, interfacing surfaces of a steering axle assembly may rotate with minimal friction without use of lubricant. By precluding application of lubricant, the steering axle assembly may be sealed by caps inhibiting intrusion of contaminants, thus providing an assembly with reduced maintenance demands. Rotation of a steering knuckle around a tapered pin may be enable by utilizing bushings formed of a material that generates little friction. As a result, the steering axle assembly may experience reduced degradation, thus prolonging a useful life of the steering axle assembly components and decreasing costs.

The disclosure also provides support for an axle assembly, comprising: a tapered pin rotatably coupled to a steering knuckle and non-rotatably coupled to an axle beam end, a set of bushings circumferentially surrounding the tapered pin, and a thrust bearing arranged between the steering knuckle and the axle beam end along a central axis of rotation of the tapered pin, wherein the rotation of the steering knuckle about the tapered pin is enabled without lubricant. In a first example of the system, the set of bushings includes a first bushing arranged between the tapered pin and an inner surface of a first bore disposed in a lower arm of the steering knuckle. In a second example of the system, optionally including the first example, the set of bushings further includes a second bushing and a third bushing arranged between the tapered pin and an inner surface of a second bore disposed in an upper arm of the steering knuckle and wherein the second bushing is concentric about the third bushing. In a third example of the system, optionally including one or both of the first and second examples, the first and second bushings are formed from more than one material, including a metal at an outer portion and a polymer at an inner portion of the first and second bushings. In a fourth example of the system, optionally including one or more or each of the first through third examples, the third bushing is thicker than each of the first and second bushings and wherein the third bushing is formed from a heat treated metal to provide resistance to friction wear and torque load tolerance. In a fifth example of the system, optionally including one or more or each of the first through fourth examples, the first bushing is fixedly coupled to the inner surface of the first bore and wherein the first bushing rotates with the steering knuckle relative to the tapered pin. In a sixth example of the system, optionally including one or more or each of the first through fifth examples, the second bushing is fixedly coupled to the inner surface of the second bore and the third bushing is fixedly coupled to the tapered pin and wherein the second bushing rotates with the steering knuckle relative to the third bushing and the tapered pin. In a seventh example of the system, optionally including one or more or each of the first through sixth examples, a diameter of the tapered pin is narrower at an upper portion of the tapered pin than a lower portion of the tapered pin. In an eighth example of the system, optionally including one or more or each of the first through seventh examples, the tapered pin extends sequentially through each of the first bore, a third bore disposed in the axle beam end, and the second bore, from a bottom end of the tapered pin to a top end of the tapered pin along the central axis. In a ninth example of the system, optionally including one or more or each of the first through eighth examples, the system further comprises: a first cap sealingly engaged with a bottom opening of the first bore and a second cap sealingly engaged with a top opening of the second bore and wherein fluid does not flow between the first cap and the bottom opening of the first bore or between the second cap and the top opening of the second bore. In a tenth example of the system, optionally including one or more or each of the first through ninth examples, the tapered pin is enclosed within a sealed inner chamber defined by the inner surface of the first bore, an inner surface of the thrust bearing, an inner surface of the third bore, the inner surface of the second bore, and the first and second caps and wherein lubricant does not enter or exit the inner chamber. In a eleventh example of the system, optionally including one or more or each of the first through tenth examples, the thrust bearing is a sealed thrust bearing.

The disclosure also provides support for a steering axle assembly, comprising: a pin coupled without lubricant to a steering knuckle and to an axle beam end, a first cap positioned above the pin and a second cap positioned below the pin along a central axis of rotation of the pin, the first and second caps configured to be free of openings, and a sealed thrust bearing circumferentially surrounding the pin and arranged below the axle beam end along the central axis of rotation. In a first example of the system, the first cap and the second cap are coupled to bores disposed in the steering knuckle and configured to sealingly engage with the bores. In a second example of the system, optionally including the first example, axle beam end and the thrust bearing are arranged between a lower arm and an upper arm of the steering knuckle and the bores are disposed in the lower arm and the upper arm. In a third example of the system, optionally including one or both of the first and second examples, the sealed thrust bearing is positioned between the axle beam end and the lower arm and configured to receive and disperse an axial load imposed on the steering axle assembly by a weight of an axle beam. In a fourth example of the system, optionally including one or more or each of the first through third examples, bushings are inserted between the pin and surfaces of the steering knuckle circumferentially surrounding the pin and wherein the bushings are configured to enable low-friction rotation of the steering knuckle around the pin. In a fifth example of the system, optionally including one or more or each of the first through fourth examples, the pin is tapered with a journal arranged at a top end of the pin.

The disclosure also provides support for a vehicle, comprising: an axle assembly including a kingpin coupled to an axle beam end, a steering knuckle, and a sealed thrust bearing, wherein the axle assembly is configured to be lubricant-free. In a first example of the system, the system further comprises: bushings arranged between the steering knuckle and the kingpin, the bushings configured to allow the steering knuckle to rotate around the kingpin with reduced friction.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An axle assembly, comprising:
   a tapered pin rotatably coupled to a steering knuckle and non-rotatably coupled to an axle beam end;
   a set of bushings circumferentially surrounding the tapered pin; and
   a thrust bearing arranged between the steering knuckle and the axle beam end along a central axis of rotation of the tapered pin;
   wherein the rotation of the steering knuckle about the tapered pin is enabled without lubricant;
   wherein the set of bushings includes a first bushing, a second bushing, and a third bushing, wherein the second bushing is fixedly coupled to the steering knuckle and the third bushing is fixedly coupled to the tapered pin and wherein the second bushing rotates with the steering knuckle relative to the third bushing and the tapered pin;
   wherein the thrust bearing is an axial bearing that includes an upper raceway, a lower raceway, and a friction element that is positioned axially between the upper raceway and the lower raceway; and
   wherein an inner surface of the second bushing in face sharing contact with an outer surface of the third bushing has a constant diameter along its length.

2. The axle assembly of claim 1, wherein the first bushing is arranged between the tapered pin and an inner surface of a first bore disposed in a lower arm of the steering knuckle.

3. The axle assembly of claim 2, wherein the second bushing and the third bushing are arranged between the tapered pin and an inner surface of a second bore disposed in an upper arm of the steering knuckle and wherein the second bushing is concentric about the third bushing.

4. The axle assembly of claim 3, wherein the first and second bushings are formed from more than one material, including a metal at an outer portion and a polymer at an inner portion of the first and second bushings.

5. The axle assembly of claim 4, wherein the third bushing is thicker than each of the first and second bushings and wherein the third bushing is formed from a heat treated metal to provide resistance to friction wear and torque load tolerance.

6. The axle assembly of claim 3, wherein the tapered pin extends sequentially through each of the first bore, a third bore disposed in the axle beam end, and the second bore, from a bottom end of the tapered pin to a top end of the tapered pin along the central axis.

7. The axle assembly of claim 6, further comprising a first cap sealingly engaged with a bottom opening of the first bore and a second cap sealingly engaged with a top opening of the second bore and wherein fluid does not flow between the first cap and the bottom opening of the first bore or between the second cap and the top opening of the second bore.

8. The axle assembly of claim 7, wherein the tapered pin is enclosed within a sealed inner chamber defined by the inner surface of the first bore, an inner surface of the thrust bearing, an inner surface of the third bore, the inner surface of the second bore, and the first and second caps and wherein lubricant does not enter or exit the inner chamber.

9. The axle assembly of claim 2, wherein the first bushing is fixedly coupled to the inner surface of the first bore and wherein the first bushing rotates with the steering knuckle relative to the tapered pin.

10. The axle assembly of claim 1, wherein the thrust bearing is a sealed thrust bearing.

11. A steering axle assembly, comprising:
- a pin coupled without lubricant to a steering knuckle and to an axle beam end;
- a first cap positioned above the pin and a second cap positioned below the pin along a central axis of rotation of the pin, the first and second caps configured to be free of openings;
- a sealed thrust bearing circumferentially surrounding the pin and arranged below the axle beam end along the central axis of rotation; and
- a first bushing, a second bushing, and a third bushing;
- wherein the second bushing and the third bushing are inserted between the pin and surfaces of the steering knuckle circumferentially surrounding the pin;
- wherein the second bushing is fixedly coupled to the surface of the steering knuckle, the third bushing is fixedly coupled to the pin, and wherein the second bushing rotates with the steering knuckle relative to the third bushing and the pin;
- wherein the thrust bearing is an axial bearing that includes an upper raceway, a lower raceway, and a friction element that is positioned axially between the upper raceway and the lower raceway; and
- wherein an inner surface of the second bushing in face sharing contact with an outer surface of the third bushing has a constant diameter along its length.

12. The steering axle assembly of claim 11, wherein the first cap and the second cap are coupled to bores disposed in the steering knuckle and configured to sealingly engage with the bores.

13. The steering axle assembly of claim 12, wherein axle beam end and the thrust bearing are arranged between a lower arm and an upper arm of the steering knuckle and the bores are disposed in the lower arm and the upper arm.

14. The steering axle assembly of claim 13, wherein the sealed thrust bearing is positioned between the axle beam end and the lower arm and configured to receive and disperse an axial load imposed on the steering axle assembly by a weight of an axle beam.

15. The steering axle assembly of claim 11, wherein the first and second bushings are configured to enable low-friction rotation of the steering knuckle around the pin.

16. The steering axle assembly of claim 11, wherein the pin is tapered with a journal arranged at a top end of the pin.

17. A vehicle, comprising:
- an axle assembly including a first bushing, a second bushing a third bushing, and a kingpin coupled to an axle beam end, a steering knuckle, a sealed thrust bearing, the first bushing, and the second bushing;
- wherein the first bushing is fixedly coupled to the steering knuckle and the second bushing is fixedly coupled to the kingpin and wherein the first and second bushings enable low-friction;
- wherein an inner surface of the third bushing in face sharing contact with an outer surface of the second bushing has a constant diameter along its length; and
- wherein the thrust bearing is an axial bearing includes an upper raceway, a lower raceway, and a friction element that is positioned axially between the upper raceway and the lower raceway.

18. The vehicle of claim 17, wherein the second bushing is constructed out of metal.

* * * * *